United States Patent
Takemura et al.

[11] Patent Number: 5,819,779
[45] Date of Patent: Oct. 13, 1998

[54] TIRE VALVE CAP FOR MEASURING AIR PRESSURE

[75] Inventors: Touji Takemura; Hirohisa Maki, both of Kosai, Japan

[73] Assignee: Fuji Univance Corporation, Shizuoka, Japan

[21] Appl. No.: 716,887

[22] Filed: Sep. 20, 1996

[30] Foreign Application Priority Data

Oct. 20, 1995 [JP] Japan .................................. 7-272567

[51] Int. Cl.$^6$ .................................................. F16K 15/70
[52] U.S. Cl. ........................ 137/229; 137/228; 73/146.8
[58] Field of Search .................... 137/227, 228, 137/229, 233, 557; 73/146.8, 146.3; 116/34 R

[56] References Cited

U.S. PATENT DOCUMENTS

| | | | |
|---|---|---|---|
| 1,276,089 | 9/1918 | Loomis et al. | 137/227 |
| 1,422,256 | 7/1922 | Conrad | 73/146.8 |
| 1,494,001 | 5/1924 | McPherson | 73/146.8 |
| 3,889,530 | 6/1975 | Bluem | 137/228 X |
| 3,994,312 | 11/1976 | Tanner et al. | 73/146.8 X |
| 4,072,048 | 2/1978 | Arvan | 73/146.8 |
| 4,136,560 | 1/1979 | Gellos | 73/146.8 |
| 4,464,929 | 8/1984 | Willis | 73/146.8 |
| 4,606,391 | 8/1986 | Achterholt | 73/146.8 X |
| 4,944,323 | 7/1990 | Bartholomew et al. | 137/227 |

FOREIGN PATENT DOCUMENTS

| | | |
|---|---|---|
| 27 53 051 | 5/1979 | Germany . |
| 2 016 697 | 9/1979 | United Kingdom . |

*Primary Examiner*—John Rivell
*Assistant Examiner*—Meredith H. Schoenfeld
*Attorney, Agent, or Firm*—Wenderoth, Lind & Ponack, L.L.P.

[57] ABSTRACT

In the state where a tire valve cap body has been fixedly screwed onto a valve mouthpiece, a top cover is pushed to open a tire valve, allowing introduction of a tire air pressure. A piston is slidably incorporated in a cylinder chamber defined within the top cover and is urged by a return spring. Upon the introduction of the tire air pressure, the piston is displaced to a position at which the biasing force of the return spring balances with the force of the introduced air pressure. An indication mechanism is provided to indicate, through an indication window formed in a cylinder member, a position of the piston member displaced by the tire air pressure introduced, thereby indicating a measurement value of the tire air pressure.

16 Claims, 14 Drawing Sheets

TIRE VALVE CAP FOR MEASURING AIR PRESSURE

BACKGROUND OF THE INVENTION

1. Field of the Invention

The present invention relates generally to a tire valve cap intended to be mounted in place of a rubber cap on an automobile tire valve for measuring a tire air pressure, and more particularly to a tire valve cap allowing a scale indication of a tire pressure value through introduction of the tire air pressure by push-in operation.

2. Description of the Related Arts

Conventional automobile tires are each provided with a valve mouthpiece for introducing air into inner tubes of the tires. The valve mouthpiece is threaded to be mounted with a cap thereon and incorporates a valve mechanism. The valve mechanism includes a spindle disposed in a central air-flow hole and carrying a valve thereon. The valve remains closed as long as the spindle tip protrudes but the valve is opened once the spindle tip is pushed. A black rubber cap is mounted on the tire valve mouthpiece. The cap serves to not only protect the valve mouthpiece from invasion of dust or foreign particles but also prevent air from leaking out through the valve mouthpiece.

As is well known, when checking the automobile tire air pressures, the caps must be individually removed to measure the respective air pressures by means of a pressure gauge, and after the completion of measurement the caps are again secured to the respective valves. Typically, four caps are required for an automobile, six caps for a double-tire truck, and as many as ten caps for a dual-wheel double-tire truck. Thus, checking of the tire air pressure is considerably laborious work. In recent years particularly the cap mounting and dismounting operation has tended become more and more difficult since design-conscious wheel caps are often employed, and an unskilled person may consume considerable time and labor for checking the tire air pressure associated with a single wheel cap.

SUMMARY OF THE INVENTION

According to the present invention there is provided a tire valve cap capable of easily and simply checking a tire air pressure and capable of indicating at all times the value of the tire air pressure.

The tire valve cap of the invention comprises a body fixedly screwed onto a mouthpiece of a tire valve, a cylindrical bottom cover secured to the body, and a cylindrical cap-shaped top cover slidably received in the bottom cover with its extremity protruding from the outside opening of the bottom cover, the top cover being operable to be pushed at the time of measuring the tire air pressure. A cylinder member is accommodated within the top cover. The cylinder member includes a cylinder chamber formed in its interior for introducing therein an air pressure from the tire. The cylinder member is provided with a push rod located at its extremity having an air inlet port opening into the cylinder chamber, the push rod serving to push a valve member of the tire valve to open the tire valve to thereby introduce the tire air pressure into the interior of the cylinder chamber. A retainer spring is provided to retain, together with the top cover, the cylinder member to its initial position at which the cylinder member protrudes outward from the opening of the bottom cover. A piston member is slidably received in the cylinder chamber in such a manner that the piston member is biased by a return spring, the piston member being displaced, upon the introduction of the tire air pressure, to a position at which the biasing force of the return spring balances with the force of introduced air pressure. An indication mechanism indicates a position of the piston member displaced by the introduced tire air pressure in an indication window formed in the cylinder member, to thereby indicate a measurement value of the tire air pressure. When the tire valve cap of the present invention is mounted on a tire valve mouthpiece, the body is fixedly screwed onto the valve mouthpiece by way of a packing.

The cylinder chamber opens into atmosphere by way of a first air-passage formed between the cylinder member and the top cover and a second air passage formed between the top cover and the bottom cover. The first air passage comprises a plurality of circumferentially spaced apart axially extending air-flow channels formed on the outer peripheral surface of the cylinder member. The second air passage comprises a plurality of circumferentially spaced apart axially extending air-flow channels formed on the outer peripheral surface of the top cover sliding within the bottom cover, and a plurality of air-flow channels formed in a stopper of the top cover received in the bottom cover. A disk member is further located at the extremity of the cylinder chamber confronting the piston member, the disk member provided with an axially extending guide portion coming into contact with the inner periphery of the return spring. In this manner, by allowing the cylinder chamber lying on the rear side of the piston to open into atmosphere, it would be possible to accurately determine, on the basis of the balance with the biasing force of the return spring, a position to which the piston member is displaced by the tire air pressure introduced into the opposite side of the piston member, thereby ensuring an accurate and stable measurement, which would not be influenced by the conditions such as external temperature or back pressure, as well as elongated duration of life.

A sleeve is provided in the region of the push rod formed on the cylinder member on its air introduction side, the sleeve being positioned in such a manner that it comes in abutment against the body member at a position short of a position where the push rod pushes the valve member of the tire valve by a displacement of the cylinder member caused by pushing the top cover, thereby displacing the piston member a slight distance. More specifically, the body member includes a through-hole through which the push rod of the cylinder member passes and against which periphery the sleeve comes in abutment. The distance by which the sleeve is displaced to abut against the periphery of the through-hole is set to be shorter than the distance by which the cylinder member is displaced to abut against the body. The sleeve comprises a base mounted in the region of the push rod of the cylinder member, and a pair of horns forking from the base, the pair of horns being inserted respectively into a pair of substantially semi-annular holes formed in the region of the push rod in such a manner that the pair of horns are displaceable in the axial direction. The mounting of such a sleeve would ensure a secure stroke of the piston member in response to the introduced air pressure and therefore a smooth measurement regardless of adhesion of an O-ring to the inner wall of the cylinder member arising from its long-term non-usage, since upon the measurement the sleeve slightly displaces the piston member by use of force pushing the top cover.

The indication mechanism of the tire valve cap comprises a radially extending indicator formed at the terminal end of the piston for indicating a pressure, a pair of slots formed in a cylindrical portion of the cylinder member and in which the indicator is freely displaceable in the axial direction, and pressure indication scales and numerals provided on the outer peripheral surface along the pair of slots, the top cover being comprised of a transparent member. The indicator is preferably colored a distinguished color. The top cover, the cylinder member and the piston member are rotatable relative to the bottom cover fixedly secured to the body so that the indication mechanism is angularly displaceable to an arbitrary angular position. This will lead to a provision of a tire valve cap which is easily distinguishable and whose indication is free from error and easy to read without disappearance.

A disk member is placed on the inner surface of a cap end of the top cover on its extremity side and has a plane on which various information is displayed. The disk member includes a groove for receiving one end of the return spring interposed between the disk member and the piston member, and a shoulder for positioning the cylinder member. The disk member may carry a sheet member such as a photograph or a printed paper between front surface of the disk member and the inner surface of the cap end of the top cover. The disk member includes a notch or a through-hole in order to allow air to be discharged therethrough when it is placed on the inner surface of the cap end of the top cover. The cap end of the top cover on which inside the disk member is received may be shaped into a magnifying lens.

The above and other objects, features, and advantages of the present invention will become more apparent from the following detailed description with reference to the accompanying drawings.

DETAILED DESCRIPTION OF THE PREFERRED EMBODIMENTS

Figure 1A:
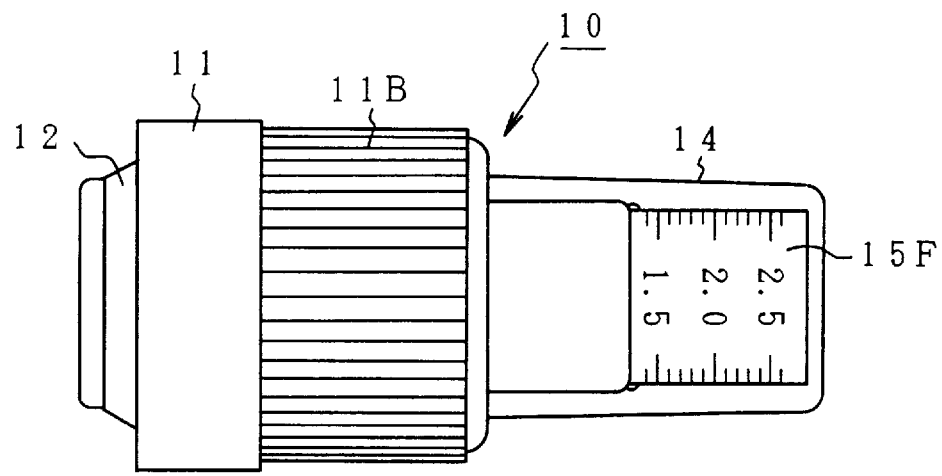
FIGS. 1A and 1B are external views of a tire valve cap constructed in accordance with the present invention.
Figure 1B:
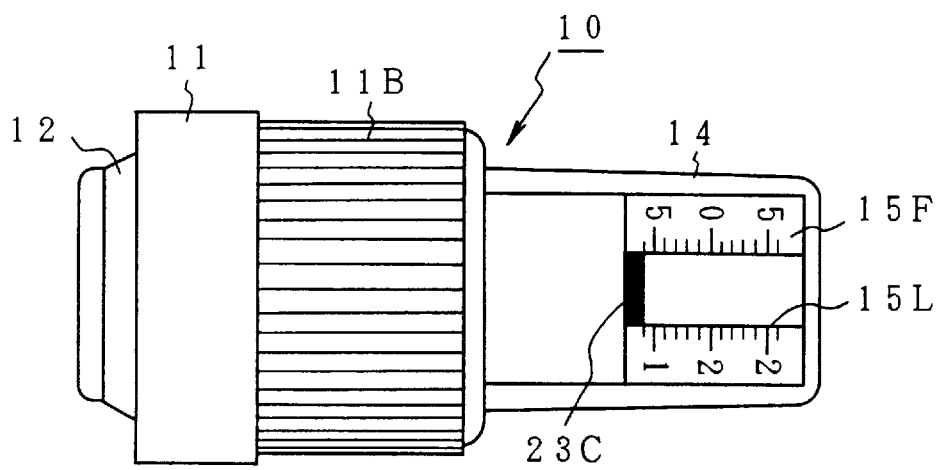

Referring now to FIGS. 1A and 1B there is depicted a tire valve cap according to the present invention, respectively, in front elevational view and in top plan view. The tire valve cap generally designated at reference numeral 10 comprises an anchor nut 12 serving as a body screwed onto a tire mouthpiece, a bottom cover 11 secured to the anchor nut 12 and having a serration 11B along its periphery, and a top cover 14 axially and freely forced into the bottom cover 11. The top cover 14 is made of a transparent plastic material so as to allow a scale indication area 15F formed on a cylindrical member, which is accommodated within the interior of the top cover 14 and will be described later, to be viewed from the exterior. The scale indication area 15F includes a pair of slits 15L (only one is shown) extending in the axial direction as can be seen in top plan view of FIG. 1B, in which slits 15L there are positioned ends of a pressure indicator 23C provided on a piston which is housed within a cylinder member 15 and will be described later.

Figure 2:
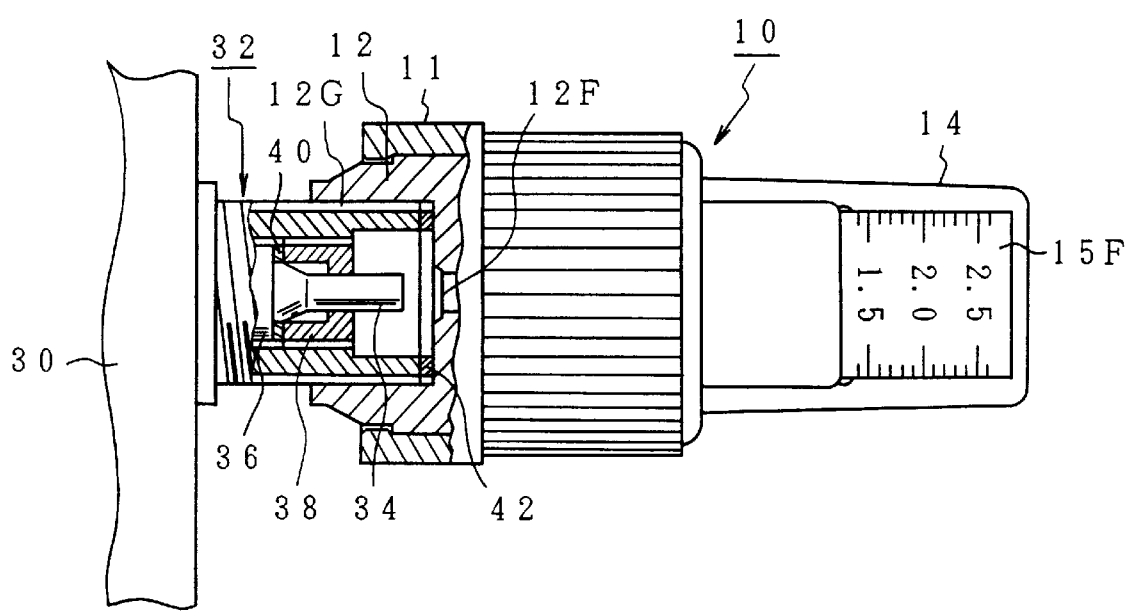
FIG. 2 is a partially sectional view of the tire valve cap according to the present invention mounted on a valve mouthpiece of a tire.

Referring to FIG. 2 the tire valve cap 10 is shown mounted on an automobile tire 30. The automobile tire 30 is provided with a tire mouthpiece generally designated at 32. The tire mouthpiece 32 is formed with a mounting screw on its external periphery. Thus, a threaded hole 12G of the anchor nut 12 of the tire valve cap 10 is screwed onto the mounting screw to thereby accomplish the mounting of the tire valve cap 10 onto the tire mouthpiece 32. It is to be noted that in this case the anchor nut 12 is screwed onto the mounting screw with a rubber packing 42 disposed at the extremity of the tire mouthpiece 32, thereby preventing any air leakage. The tire mouthpiece 32 is provided in its interior with a spindle 34. The spindle 34 is fitted from the inside into a valve support member 38 which is fixedly screwed into the interior of the tire mouthpiece 32. A valve seat packing 40 is interposed between a spindle base 36 and the valve support member 38. In the state where the spindle 34 protrudes as shown, the valve seat packing 40 is pressed against the valve support member 38 by a pressing force arising from the air pressure within the tire 30 and applied to the spindle base 36, to thereby close the valve. When the spindle 34 is pushed in, the spindle base 36 is separated from the valve seat packing 40, with the result that the valve opens. The tire valve cap 10 of the present invention is configured in such a manner that when the top cover 14 is pushed with the cap 10 mounted on the tire mouthpiece 32, a push rod which will be described later is permitted to protrude through a through-hole 12F formed in the anchor nut 12, to push in the spindle 34 to release the valve, so that air pressure within the tire 30 is introduced by way of the through-hole 12F into the interior of the tire valve cap 10.

Figure 3A:
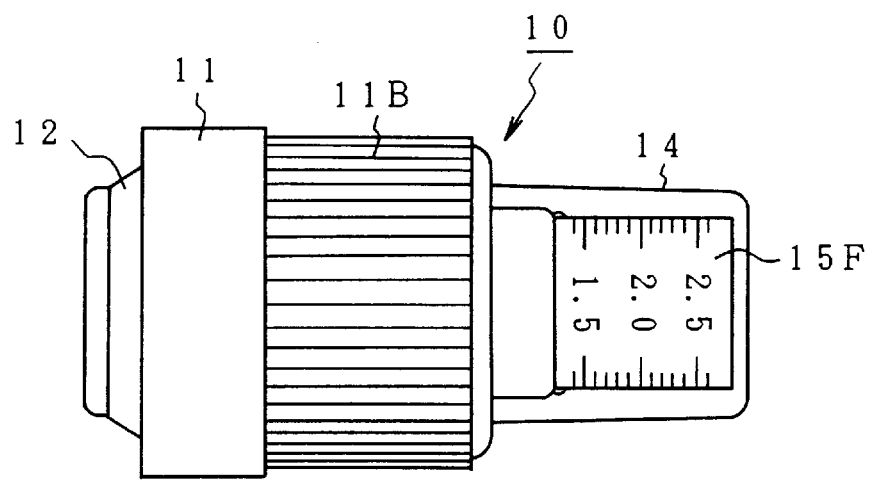
FIGS. 3A and 3B are external views of the tire valve cap according to the present invention mounted for measurement.
Figure 3B:
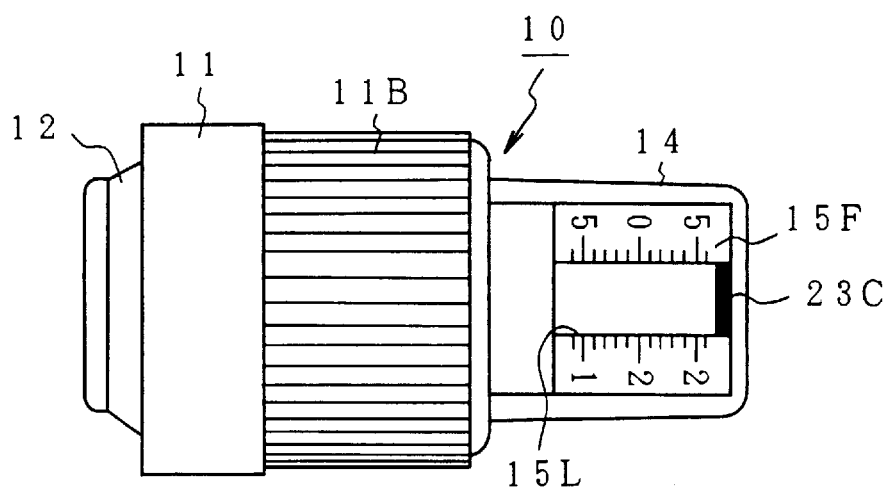

FIGS. 3A and 3B illustrate a state of measurement through the introduction of air pressure by pressing in the top cover 14, with FIG. 3B being a top plan view of FIG. 3A. In response to air pressure introduced from the tire 30 into the interior of the tire valve cap 10 by the pressing-in operation of the top cover 14, the housed piston is moved axially such that the pressure indicator 23C formed integrally with the piston is moved along the slits 15L as shown in FIG. 3B, to indicate a value of the air pressure thus introduced. FIG. 3B illustrates the pressure indicator 23C which has been moved to its maximum pressure position. In this embodiment the scale indication area 15F bears scale markings in the range from 1.4 kg/cm$^2$ to 2.6 Kg/cm$^2$ to ensure a measurement of the tire air pressure lying within this range.

Figure 4:
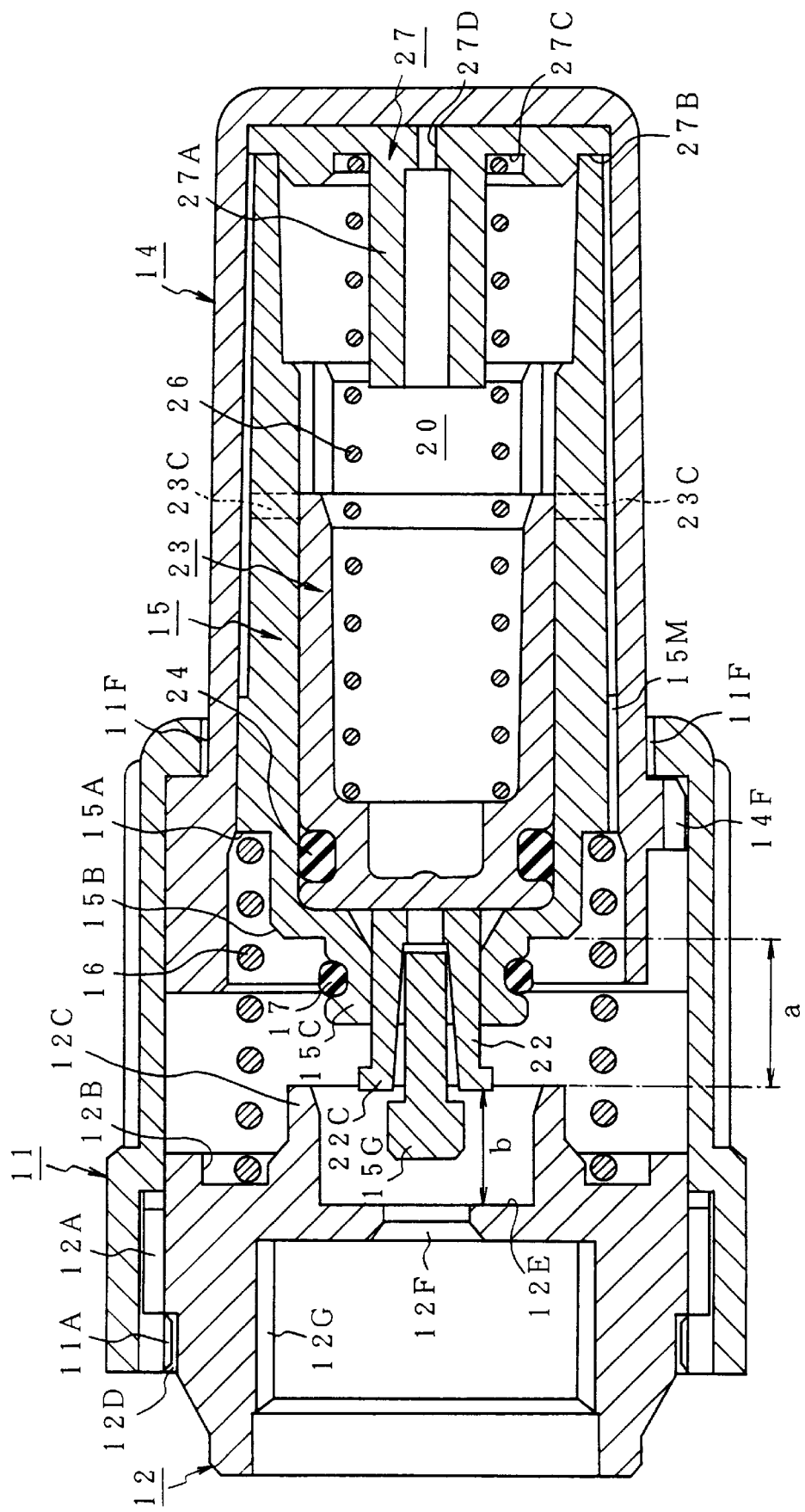
FIG. 4 is an axial sectional view of the tire valve cap according to the present invention.

FIG. 4 illustrates an axial sectional view of the tire valve cap of the present invention shown in FIG. 1A. As previously stated the anchor nut 12 acting as the body to be mounted on the tire mouthpiece includes the threaded hole 12G and the through-hole 12F formed in the extremity of the threaded hole 12G at its center. The anchor nut 12 further includes a tubular seal cylinder portion 12C communicating with the through-hole 12F and a retainer groove 12B formed in its peripheral end surface for receiving a spring. On its outer peripheral surface the anchor nut 12 is provided with a fitting groove 12D into which the bottom cover 11 is securely fitted and guide ribs 12A continuous with the fitting groove 12D and guided by guide grooves 11D formed on the inside of the bottom cover 11. The bottom cover 11 is intended to be fixedly mounted on the anchor nut 12 from the right side thereof. As is clear from FIG. 5 in which the other elements have been omitted for the purpose of explanation, the bottom cover 11 is a cylindrical member having openings at the opposite ends. The bottom cover 11 is provided with a fitting protrusion 11A formed on its left-hand end inner periphery and mated with the fitting groove 12D of the anchor nut 12 in Fig. 4, as well as the guide grooves 11D extending axially relative to the fitting protrusion 11A and mated with the guide ribs 12A of the anchor nut 12. The bottom cover 11 includes a cover chamber 11H and an opening 11E formed in the right-hand end of the cover chamber 11H for mounting the top cover 14 therein. The opening 11E has a diameter smaller than that of the cover chamber 11H so as to allow a shoulder serving to prevent the top cover 14 from coming off to be formed on the inner side of the opening edge. The opening 11E is formed with a plurality of circumferentially spaced apart air flow channels 11F.

Figure 5:
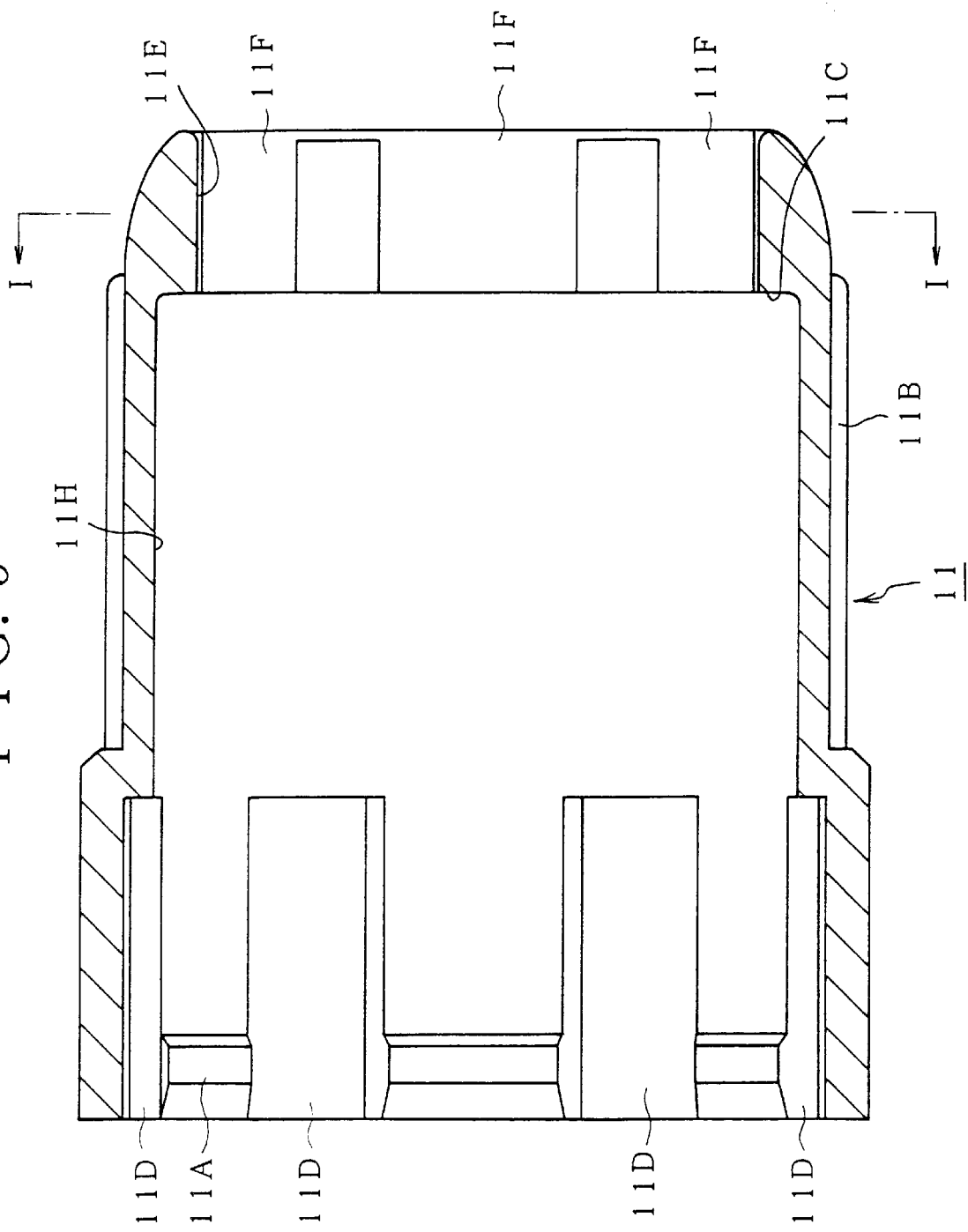
FIG. 5 is a sectional view of a bottom cover of FIG. 4.
Figure 6:
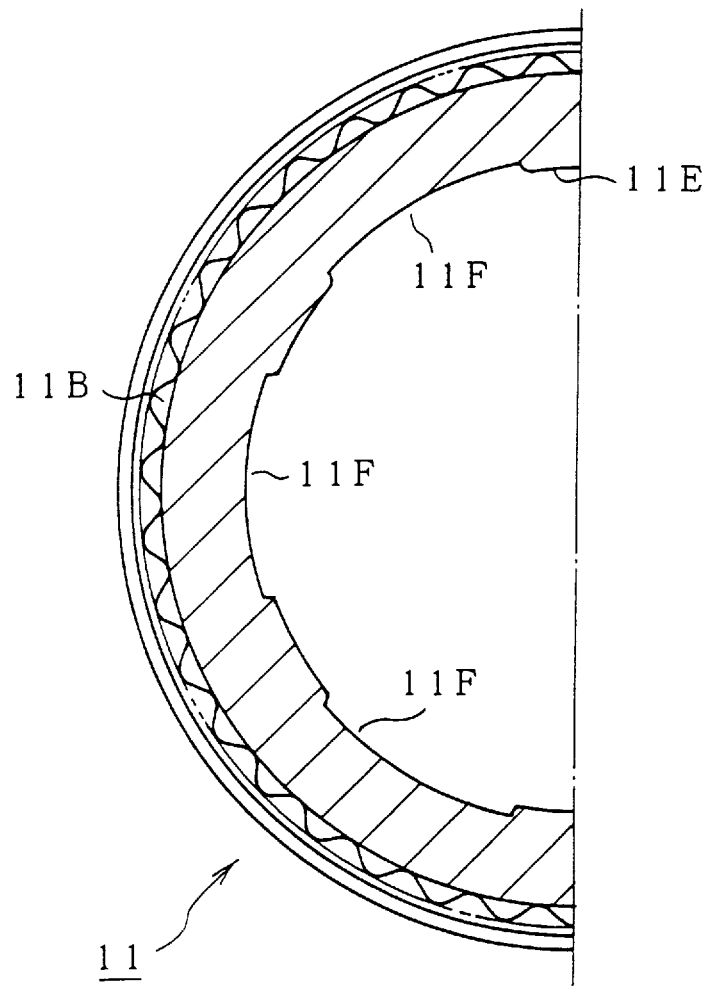
FIG. 6 illustrates a half of a section taken along a line I—I of FIG. 5.

Referring to FIG. 6 a half of a section taken along a line I—I of FIG. 5 is depicted in which the plurality of air flow channels 11F are circumferentially formed around the opening 11E. As previously described the serration 11B is provided on the outer peripheral surface of the bottom cover 11 in order to serve as an anti-slip means when the tire valve cap 10 is fixedly screwed onto the tire mouthpiece 32 of the tire 30 as shown in FIG. 2.

Referring again to FIG. 4 the top cover 14 is incorporated into the bottom cover 11 in such a manner as to be freely displaceable toward the anchor nut 12, with the bottom cover 11 being securely fitted onto the anchor nut 12. As has also been set fort h earlier the top cover 14 is made of a transparent plastic material allowing the internal structure to be viewed from the exterior.

Figure 7:
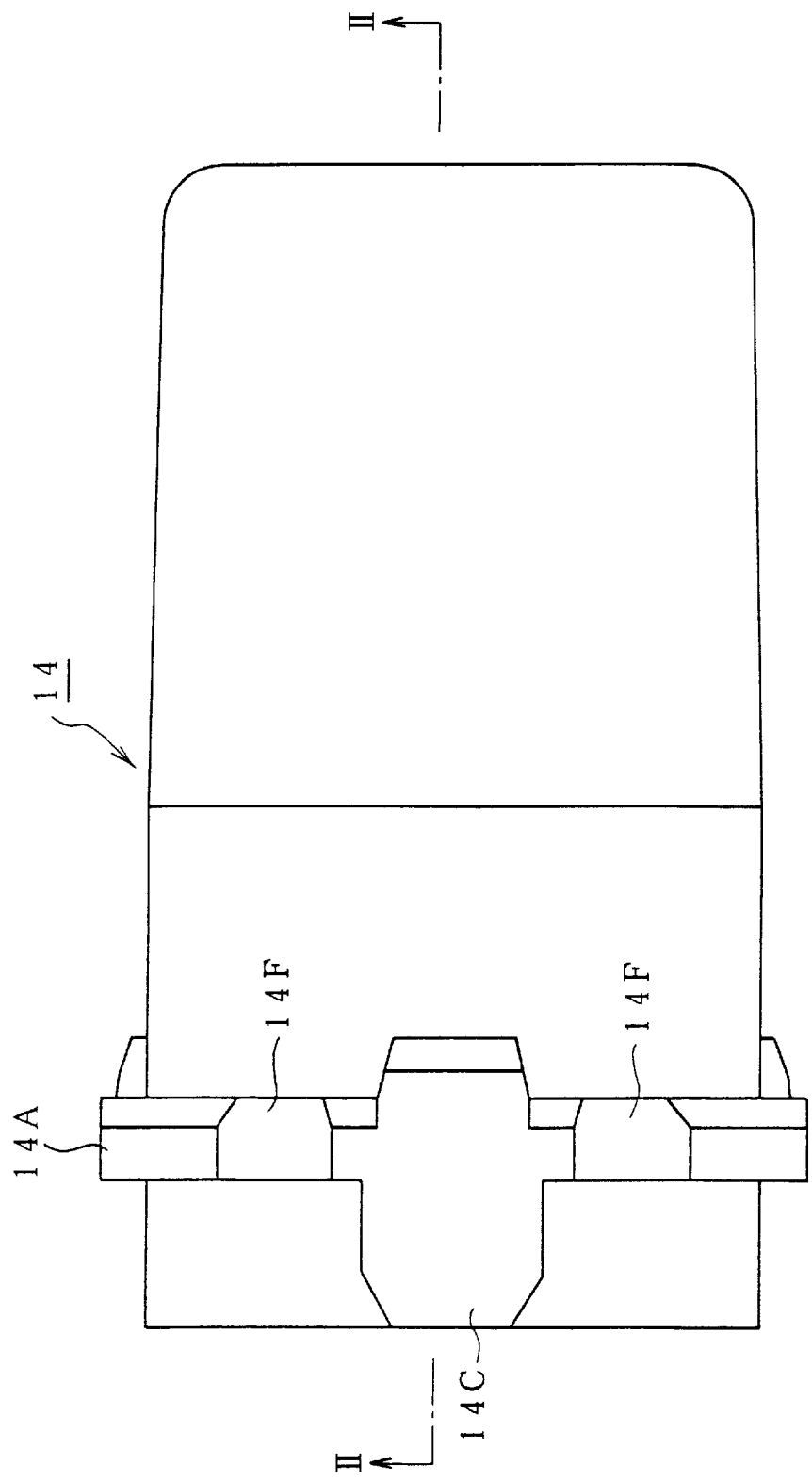
FIG. 7 is an explanatory diagram of a top cover of FIG. 4.
Figure 8:
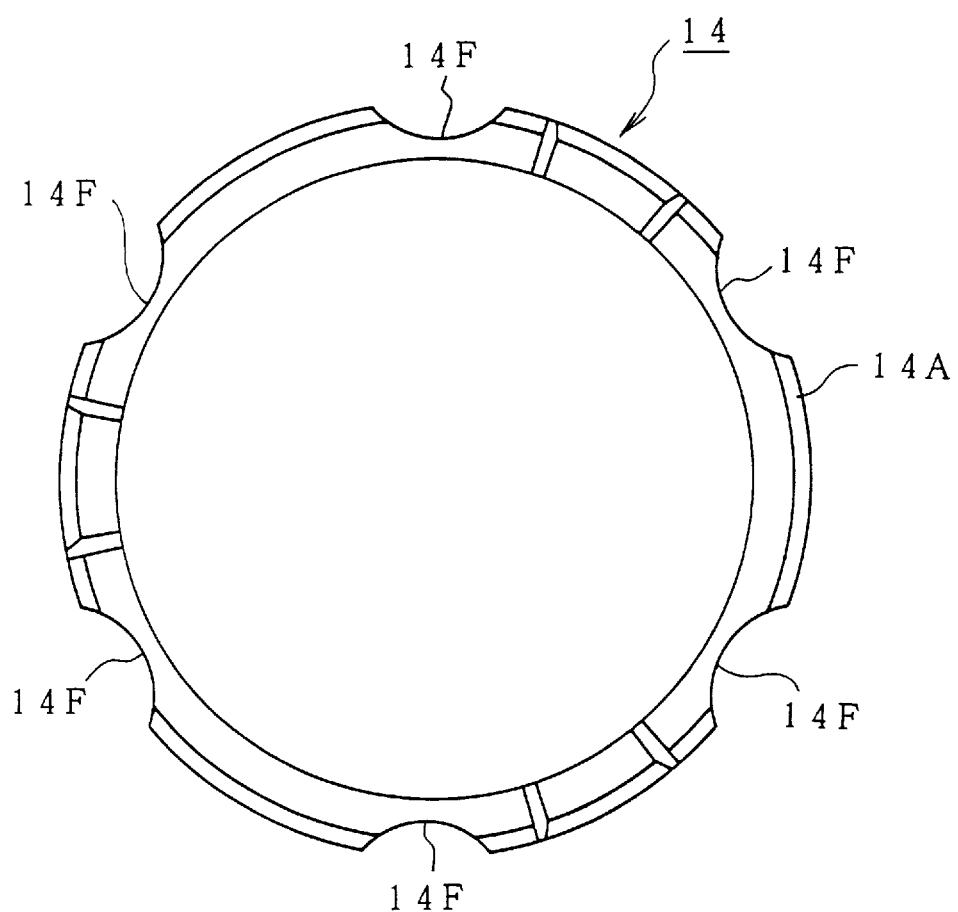
FIG. 8 is a right-hand end view of FIG. 7.
Figure 9:
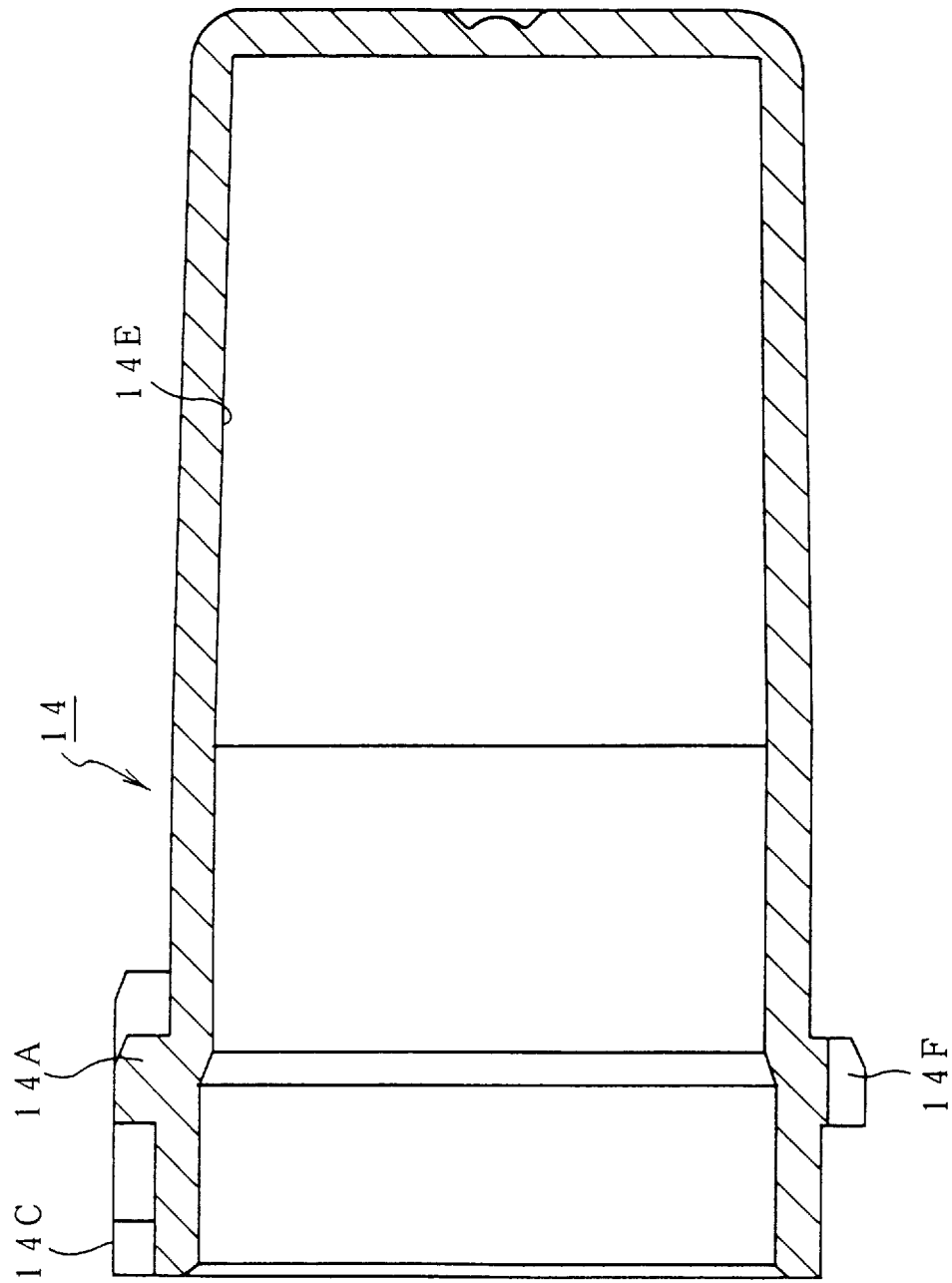
FIG. 9 is a sectional view taken along a line II—II of FIGG. 7.

Referring to FIG. 7 in which the other elements have been omitted for the purpose of explanation, the top cover 14 of FIG. 4 is exclusively illustrated. The top cover 14 includes a slide ring 14A integrally formed on the outer peripheral surface in the vicinity of the left-hand end of the cover 14 and serving as a guide when sliding on the inner periphery of the bottom cover 11, the slide ring 14A having at a circumferential midpoint a slide cam 14C extending as far as the left-hand end of the cover 14. The slide ring 14A sliding within the interior of the bottom cover 11 has a plurality of circumferentially spaced apart air flow channels 14F. Turning to FIG. 8 which is a right-hand end view of FIG. 7, six air flow channels 14F are provided in the slide ring 14A formed on the outer peripheral surface of the top cover 14. Turning then to FIG. 9 which is a longitudinal sectional view taken a long a line II—II of FIG. 7, the top cover 14 includes a cover chamber 14E which is open on the left side but is closed on the right side.

Figure 10:
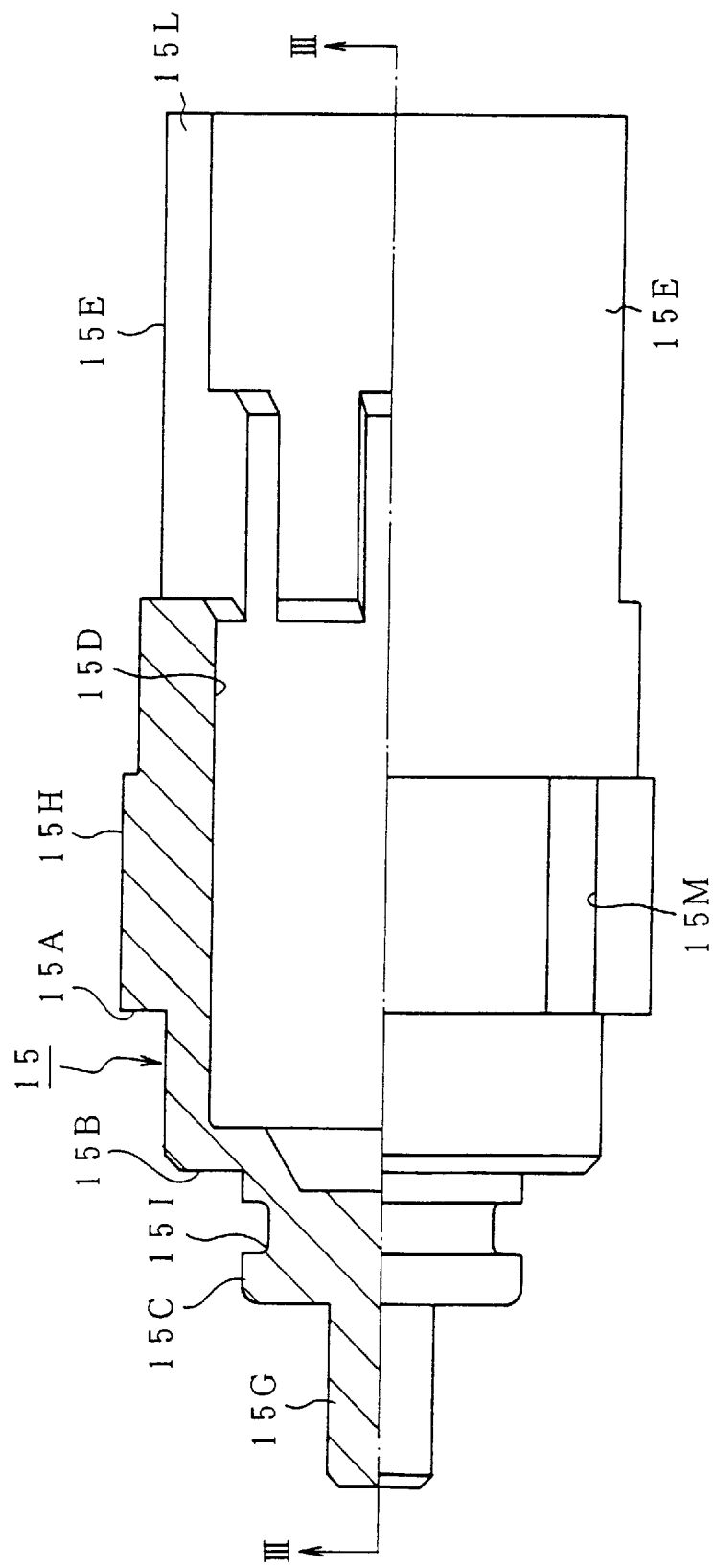
FIG. 10 is an axial semi-sectional view of a cylinder member of FIG. 4.
Figure 11:
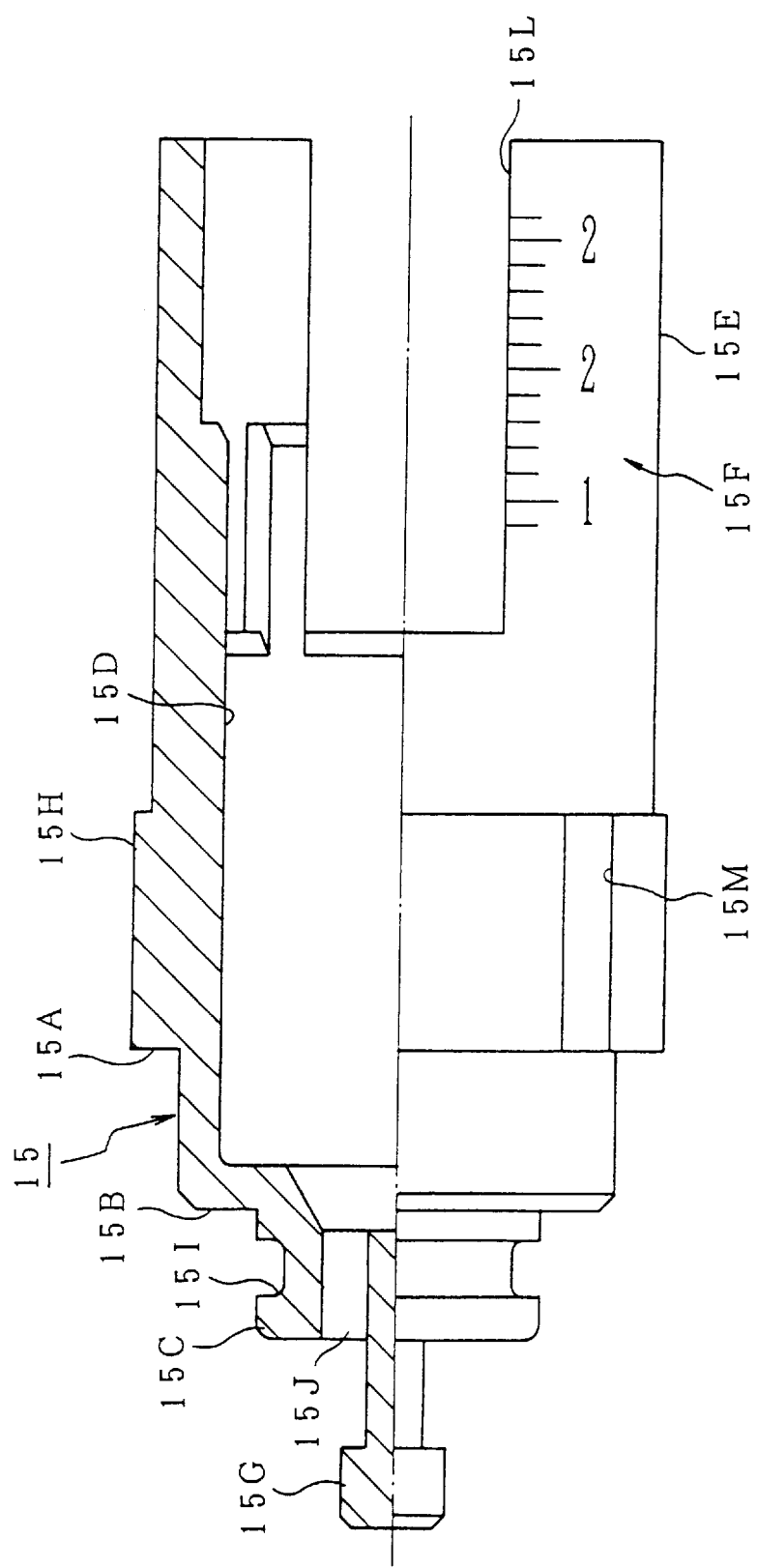
FIG. 11 is a semi-sectional view taken along a line III—III of FIG. 10.
Figure 12:
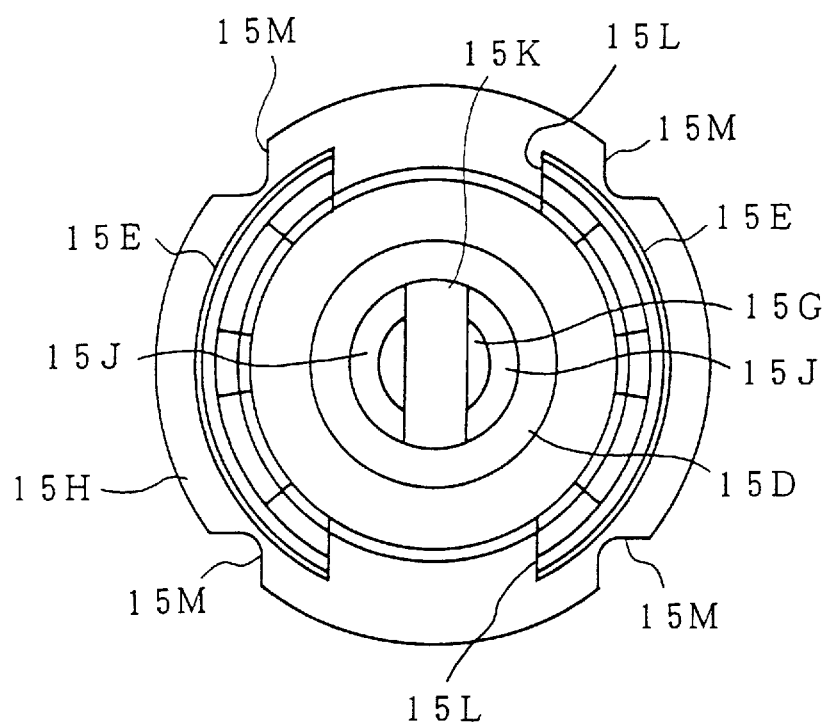
FIG. 12 is a right-hand end view of FIG. 10.

Referring back to FIG. 4 the cylinder member 15 is accommodated within the top cover 14, which has been incorporated into the bottom cover 11 in such a manner as to be freely displaceable toward the anchor nut 12, together with a disk 27 located at the right-hand end of the interior of the top cover 14. The top cover 14 and the cylinder member 15 are slidable as a unitary component in the axial direction. In such an arrangement the cylinder member 15 is being pressed against the closed right-hand end wall of the top cover 14 by a biasing force of a retainer spring 16 received in the retainer groove 12B of the anchor nut 12. The cylinder member 15 is of such a structure as shown in FIG. 10, which is a semi-sectional view thereof with the other elements omitted for simplification. The cylinder member 15 includes the push rod designated at 15G and formed at the extremity closer to the anchor nut 12, and a seal piston 15C continuous with the push rod 15G and having a circumferentially extending groove 15I for receiving an O-ring 17 therein. Continuous with the seal piston 15C is a tubular cylinder chamber 15D, which has over its outer peripheral surface a slide ring 15H being in circumferential contact with the top cover 14 positioned therearound. The slide ring 15H includes a plurality of air-flow channels 15M formed in the outer peripheral surface thereof and extending in parallel with each other in the axial direction. The cylinder chamber 15D has a guide portion 15E integrally formed in its rear part, the guide portion 15E being provided with the pair of radially opposed slits 15L. FIG. 11 is a semi-sectional view taken along a line III—III of FIG. 10. The push rod 15G located at the extremity of the cylinder member 15 protrudes leftward from the seal piston 15C with semi-annular air-flow holes 15J, which allow the tire air pressure to be introduced into the interior cylinder chamber 15D. The scale indication area 15F is provided along the slits 15L formed in the rear guide portion 15E following the cylinder chamber 15D. FIG. 12 is a right-hand end view of FIG. 10 with the push rod 15G formed at its end being viewed from the inside. The push rod 15G resting on the end is supported internally by a bridge portion 15K defining the semi-annular air-flow holes 15J on both of its sides. As described previously the guide portion 1SE formed in the rear of the cylinder chamber 15D of the cylinder member 15 is provided with the pair of slits 15L arranged radially in opposition to each other. The plurality of, four in this embodiment, air-flow channels are formed in the outer peripheral surface of the cylinder chamber 15D and extend in parallel with one another in the axial direction. As is apparent from FIGS. 10 and 11 the cylinder member further comprises a stopper surface 15B formed at the end of the seal piston 15C opposite to the push rod 15G, and a spring seat 15A provided in the form of the shoulder at the end of the slide ring 15H.

Referring again to FIG. 4 the cylinder member 15 housed in the top cover 14 is fitted onto a cylinder seat 27B formed on the inside periphery of the disk 27 positioned at the right-hand end of the top cover 14, with the spring seat 15A bearing the retainer spring 16 interposed between the spring seat 15A and the retainer groove 12B of the anchor nut 12. The O-ring 17 is received in the groove 15I of the seal piston 15C formed on the outer side of the push rod 15G of the cylinder member 15. When the top cover 14 is pushed in leftward, the cylinder member 15 is displaced against the spring force of the retainer spring 16, allowing the push rod 15G to protrude leftward through the through-hole 12F of the anchor nut 12. At the same time the seal piston 15C is fitted into the seal cylinder portion 12C of the anchor nut 12 with sealing by the O-ring 17, to define a sealed space extending from the through-hole 12F of the anchor nut 12 to the cylinder chamber 15D for introducing the tire air pressure. The piston generally designated at 23 is slidably accommodated within the cylinder chamber 15D of the cylinder member 15 with an O-ring 24 mounted thereon. A return spring 26 is interposed between the piston 23 and the rearward positioned disk 27. The disk 27 includes a guide portion 27A integrally formed therewith, onto which the right-hand part of the return spring 26 is fitted, the guide portion 27A serving to restrict deformation of the return spring 26 caused by the axial displacement of the piston 23. The pressure indicator 23C is integrally formed on the piston 23 at its right-hand end and extends radially in the form of a lug. This pressure indicator 23C is positioned within the pair of slits 15L formed on the rear part of the cylinder member 15, which has been exclusively depicted in FIGS. 10 to 12, to provide pressure readings for the scale indication area 15F as shown in FIG. 1B. It would be desirable to color the pressure indicator 23C red or yellow to facilitate viewing from the exterior.

Figure 13:
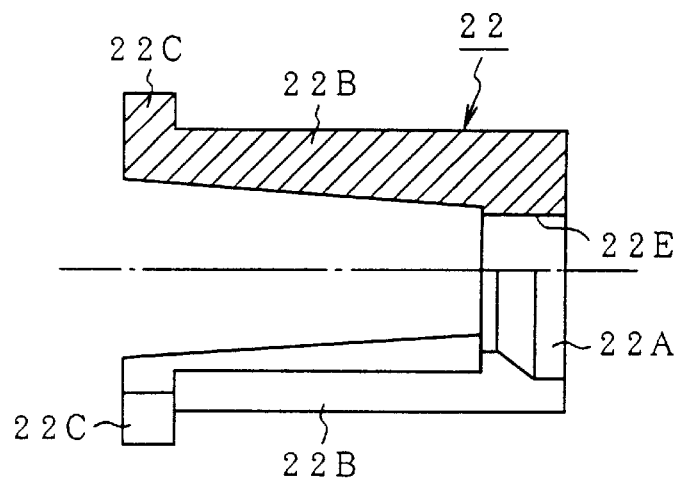
FIG. 13 is a semi-sectional view of a sleeve of FIG. 4.
Figure 14:
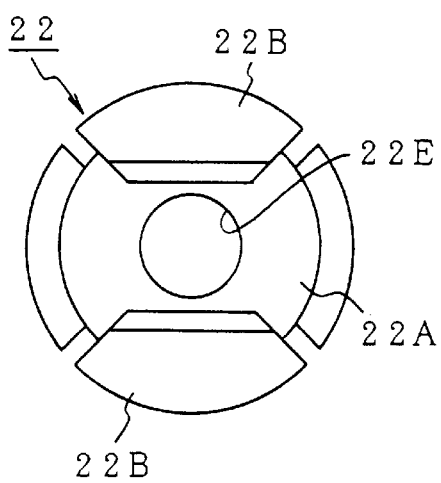
FIG. 14 is a left-hand end view of FIG. 13.
Figure 15:
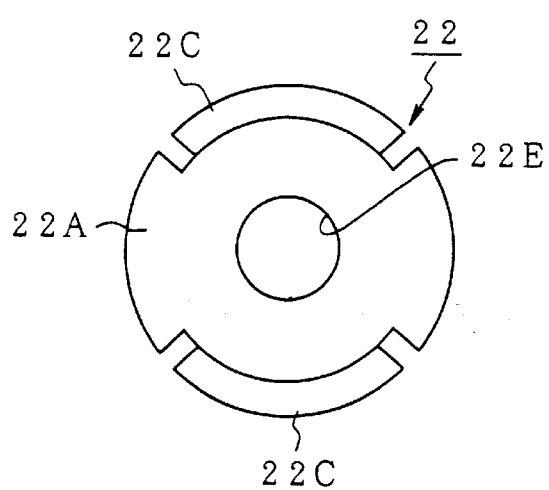
FIG. 15 is a right-hand end view of FIG. 13.

A sleeve 22 is incorporated in the end wall of the cylinder member 15 on the left-hand air introduction side of the piston 23 accommodated within the cylinder member 15. As depicted exclusively in semi-sectional view of FIG. 13, the sleeve 22 comprises a sleeve body 22A having an air-flow hole 22E, a couple of horns 22B extending leftward from the sleeve body 22A, and abutting portions 22C formed at the tips of the horns 22B and extending radially outwardly. FIG. 14 is a left-hand end view of FIG. 13, whereas FIG. 15 is a right-hand end view of FIG. 13. The sleeve 22 is incorporated in the region of the push rod 15G as shown in FIG. 4 in such a manner that the horns 22B are fitted into the semi-annular air-flow holes 15J formed on both sides of the bridge portion 15K of the cylinder member 15 as shown in FIG. 12. When the top cover 14 is forced in leftward, the sleeve 22 is also displaced in the same direction together with the cylinder member 15, with the result that the abutting portions 22C of the sleeve 22 abut against the end surface 12E of the anchor nut 12 before the cylinder member 15 comes to a stop by abutting of the stopper surface 15B against the end surface of the seal cylinder portion 12C of the anchor nut 12, thereby allowing the piston 23 to be slightly displaced rightward. Such a displacement of the piston 23 arising from the abutting of the sleeve 22 against the end surface 12E will release the O-ring 24 mounted on the piston 23 from the adhesion onto the peripheral surface of the cylinder chamber 15D of the cylinder member 15 due to long-term non-usage of the O-ring 24, thereby ensuring a secure displacement of the piston 23 by the tire air pressure subsequently introduced. In order to ensure the displacement of the piston 23 by the abutting of the sleeve 22 against the end surface 12E, distance (b) between the abutting portions 22C of the sleeve 22 and the end surface 12E of the anchor nut 12 is shorter by the amount of compulsory displacement of the piston 23 than distance (a) between the stopper surface 15B of the cylinder member 15 and the end surface of the seal cylinder portion 12C of the anchor nut 12.

In the initial state of FIG. 4 where the tire air pressure has not yet been introduced, a chamber 20 loaded with the return spring 26 on the right side of the piston 23 communicates through the slits 15L of the cylinder member 15 and the peripheral air-flow channels 15M with the cover chamber 11H of the bottom cover 11. The cover chamber 11H of the bottom cover 11 in turn leads to the exterior by way of the air-flow channels 14F of the top cover 14 and the air-flow channels 11F provided in the right-hand opening 11E of the bottom cover 11. As a result, the return spring 26 loaded chamber 20 on the right side of the piston 23 is allowed to communicate with the exterior, in other words, to open into atmosphere, whereby when the piston 23 is displaced rightward upon the introduction of the tire air pressure applied to the left-hand part of the piston 23, only the biasing force of the return spring 26 will determine the position to which the piston 23 is to be displaced.

It will be appreciated that when the tire valve cap 10 of the present invention has been mounted on the tire mouthpiece 32 of the tire 30 as shown in FIG. 2, the disk 27 received within the interior of the top cover 14 at its end surface is most clearly visible from the exterior. This means that the surface of the disk 27 is available as a member for displaying various information thereon. More specifically, a sheet member such as paper or plastics having photographs or letters printed thereon may be placed on the front side surface of the disk 27. On the end surface opposite to its front side on which is placed the sheet member such as photographs or printed paper, the disk 27 is provided in the mentioned order from its periphery toward the center with the cylinder seat 27B, a retainer groove 27C for receiving the end of the return spring 26, and the guide portion 27A for guiding the return spring 26. The disk 27 is further provided with an air-flow hole 27D formed in the center of the disk 27 so as to allow a communication between both sides thereof. The provision of the air-flow hole 27D will allow closed-side air to be discharged through the air-flow hole 27D to the left when the disk 27 is inserted into the top cover 14, thereby ensuring smooth insertion of the disk 27. It is natural that the air-flow hole 27D may be replaced by an axially communicating notch formed in the periphery of the disk 27. In order to provide an enlarged display of a photograph or printed sheet member placed on the front side of the disk 27, a convex lens may be formed integrally on the cap-like end of the top cover 14 made of a transparent material, whereby one can see to a larger scale the photograph or letters sandwiched between the front side of the disk 27 and the inner end surface of the cap-like end.

Figure 16:
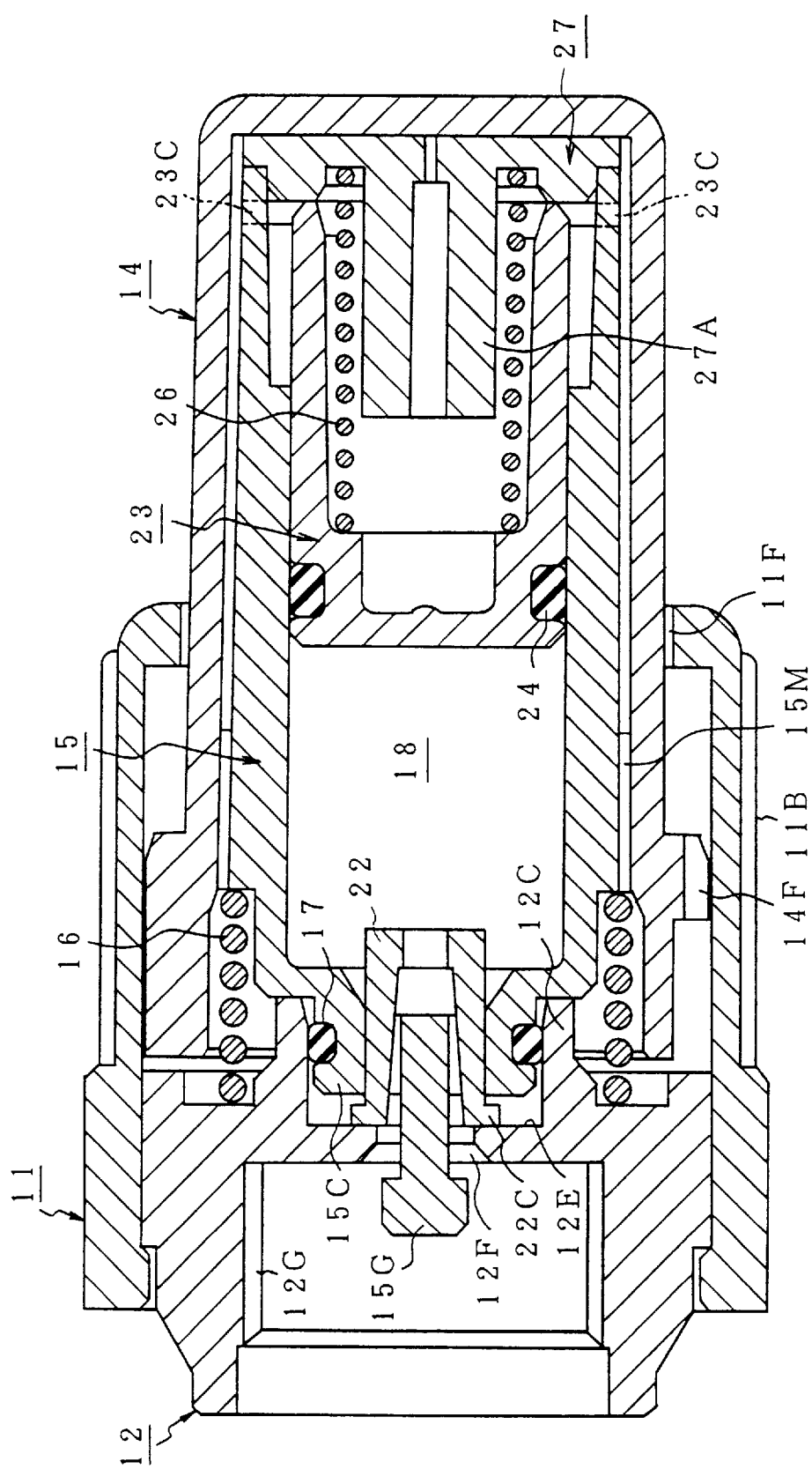
FIG. 16 is a sectional view of the tire valve cap according to the present invention in its tire air pressure measuring state.

With reference to FIG. 4 action will now be described of measuring the tire air pressure by pressing in the top cover 14 leftward. Naturally tire valve cap remains fixedly secured to the tire mouthpiece 32 of the tire 30 as shown in FIG. 2. When the top cover 14 is pushed with a finger, the leftward displacement of the top cover 14 will bring about a simultaneous displacement of the internal cylinder member 15. The leftward displacement of the cylinder member 15 will allow the abutting portions 22C of the sleeve 22, which are incorporated in the end wall of the cylinder member 15, to come into abutment against the end surface 12E surrounding the through-hole 12F of the anchor nut 12. This will bring the motion of the sleeve 22 to rest. When further pushed, the cylinder member 15 is displaced leftward with the motion of the piston 23 halted due to the presence of the sleeve 22. This relative movement between the piston 23 and the cylinder member 15 will release the O-ring 24 from possible adhesion onto the inner peripheral surface of the cylinder chamber 15D, thus ensuring a movement of the piston 23 in response to the subsequent introduction of the air pressure. Additional leftward displacement of the cylinder member 15 following the top cover 14 will bring the stopper surface 15B of the cylinder member 15 in abutment against the end surface of the seal cylinder portion 12C of the anchor nut 12 as shown in FIG. 16. In such a state, the push rod 15G formed at the extremity of the cylinder member 15 passes through the through-hole 12F of the anchor nut 12 and reaches a position illustrated, whereas the seal piston 15C lying on the extremity side of the cylinder member 15 is fitted into the seal cylinder portion 12C of the anchor nut 12, thereby defining with the aid of the O-ring 17 a sealed space extending from the through-hole 12F of the anchor nut 12 to the cylinder chamber 18 on the left side of the piston 23. In the state where the tire valve cap is mounted on the tire mouthpiece 32 as shown in FIG. 2, the spindle 34 lies at the position of the end of the push rod 15G protruding into the open side of the anchor nut 12 as shown in FIG. 16, whereupon the push rod 15G presses against the spindle 34 leftward to separate the spindle base 36 from the valve seat packing 40 to open the valve, allowing the air pressure within the tire 30 to be introduced through the through-hole 12F into the interior of the valve cap 10. As the result of this, the tire air pressure is applied to the chamber 18 on the left side of the piston 23 as shown in FIG. 16, so that the piston 23 is displaced rightward against the return spring 26 by the action of the air pressure introduced. The piston 23 comes to a stop at a position where the force arising from the tire pressure applied to the chamber 18 on the left side thereof balances with the biasing force of the return spring 26 on the right side thereof. In this state where the piston 23 has just stopped, the pressure indicator 23C provided in the form of the lug on the right-hand end of the piston 23 comes to rest at an appropriate position in the scale indication area 15F formed along the slits 15L as shown in FIG. 3B, to indicate the pressure value of the tire air pressure introduced. By virtue of this construction, at the time of daily checking of the tire air pressure, one can immediately recognize the state of the tire air pressure merely by watching the indication of the tire valve cap 10 according to the present invention. The instant the top cover 14 is released after the completion of measurement of the tire air pressure, the retainer spring 16 restores the cylinder member 15 and the top cover 14 to their initial states. At that time the tire air pressure which has been introduced in the cylinder chamber 18 on the left side of the piston 23 is permitted to pass through the air-flow hole 22E of the sleeve 22 and the air-flow hole 15J of the cylinder member 15 into the cover chamber 11H of the bottom cover 11, and further flow through the air-flow channels 14F of the top cover 14 and the air-flow channels 11F of the bottom cover 11 into the atmosphere. In case the air pressure has fallen, the tire valve cap 10 according to the present invention is removed from the tire mouthpiece 32 to fill the tire with air by means of a compressor. After the filling of air, the tire valve cap 10 of the invention is again fixedly screwed onto the mouthpiece 32 and the top cover 14 is again pushed, thus restoring the tire air pressure in its measurement initial state.

As is clear from FIG. 4, the tire valve cap 10 of the present invention allows the top cover 14 and the cylinder member 15 constituting its indication side which are displaceable axially relative to the anchor nut 12 and the bottom cover 11 constituting its fixed side to turn to an arbitrary angular position around its longitudinal axis. For this reason, it would be possible in the state where the tire valve cap 10 of the invention is mounted on the tire mouthpiece 32 that the top cover 14 is turned to an angular position at which the pressure indicator 23C is easily visible from the exterior as can be seen in FIG. 1B and 3B.

It will be appreciated that the minimum value for the tire air pressure capable of being indicated by the scale indication area 15F can be a spring pressure in the initial state of the return spring 26 provided in the rear part of the piston 23 of FIG. 4, defined as a preset value so as to balance with the force of the indicated minimum pressure. Although in this embodiment the minimum indication tire pressure is 1.4 kg/cm$^2$, it may be defined otherwise if necessary. The present invention is not intended to be limited to the above embodiment and it would be possible to make an appropriate modification as long as its object is not impeded.

Although all of the above description has been in connection with air pressure of the automobile tires, it would also be natural that the present invention is applicable to pressure vessels, other than the tires, using such a valve mouthpiece as set forth hereinbefore.

What is claimed is:

1. A tire valve cap intended to be mounted on a tire valve mouthpiece for measuring air pressure within a tire, the tire valve cap comprising:
   a body fixedly screwed onto said tire valve mouthpiece;
   a cylindrical bottom cover secured to said body;
   a cylindrical top cover axially slidably received in said bottom cover with its extremity protruding through an outside opening of said bottom cover, said top cover being operable to be pushed at the time of measuring a tire air pressure;
   a cylinder member accommodated within said top cover and including a cylinder chamber formed in its interior for introducing therein an air pressure from said tire, said cylinder member being provided with a push rod located at its extremity having an air inlet port opening into said cylinder chamber, said push rod pushing a valve member of said tire valve to open said tire valve to thereby introduce the tire air pressure into the interior of said cylinder member;
   a retainer spring for retaining, together with said top cover, said cylinder member to its initial position at which said cylinder member protrudes outward from said opening of said bottom cover;
   a piston member slidably received in said cylinder chamber in such a manner that said piston member is biased by a return spring, said piston member being displaced, upon the introduction of said tire air pressure, to a position at which the biasing force of said return spring balances with the force of introduced air pressure; and
   an indication mechanism for indicating a position of said piston member displaced by said introduced tire air pressure in an indication window formed in said cylinder member, to thereby indicate a measurement value of said tire air pressure.

2. A tire valve cap according to claim 1, wherein said cylinder chamber opens into atmosphere by way of a first air-passage formed between said cylinder member and said top cover and a second air passage formed between said top cover and said bottom cover.

3. A tire valve cap according to claim 2, wherein said first air passage comprises a plurality of circumferentially spaced apart axially extending air-flow channels formed on the outer peripheral surface of said cylinder member.

4. A tire valve cap according to claim 2, wherein said second air passage comprises a plurality of circumferentially spaced apart axially extending air-flow channels formed on the outer peripheral surface of said top cover sliding within said bottom cover, and a plurality of air-flow channels formed in a stopper of said top cover received in said bottom cover.

5. A tire valve cap according to claim 1, further comprising a disk member located at the extremity of said cylinder chamber confronting said piston member, said disk member provided with an axially extending guide portion coming into contact with the inner periphery of said return spring.

6. A tire valve cap according to claim 1, further comprising a sleeve lying in the region of said push rod formed on said cylinder member on its air introduction side, said sleeve being positioned in such a manner that it comes in abutment against said body member at a position short of a position where said push rod pushes said valve member of said tire valve by a displacement of said cylinder member caused by pushing said top cover, thereby displacing said piston member a slight distance.

7. A tire valve cap according to claim 6, wherein said body member includes a through-hole through which said push rod of said cylinder member passes and against which periphery said sleeve comes in abutment, and wherein a distance by which said sleeve is displaced to abut against the periphery of said through-hole is set to be shorter than a distance by which said cylinder member is displaced to abut against said body.

8. A tire valve cap according to claim 6, wherein said sleeve comprises a base mounted in the region of said push rod of said cylinder member, and a pair of horns forking from said base, said pair of horns being inserted respectively into a pair of substantially semi-annular holes formed in the region of said push rod in such a manner that said pair of horns are displaceable in the axial direction.

9. A tire valve cap according to claim 1, wherein said indication mechanism comprises a radially extending indicator formed at the terminal end of said piston for indicating a pressure, a pair of slots formed in a cylindrical portion of said cylinder member and in which said indicator is freely displaceable in the axial direction, and pressure indication scales and numerals provided on the outer peripheral surface along said pair of slots, said top cover being comprised of a transparent member.

10. A tire valve cap according to claim 9, wherein said indicator is colored a distinguishing color.

11. A tire valve cap according to claim 1, wherein said top cover, said cylinder member and said piston member are rotatable relative to said bottom cover fixedly secured to said body so that said indication mechanism is angularly displaceable to an arbitrary angular position.

12. A tire valve cap according to claim 1, further comprising a disk member placed on the inner surface of a cap end of said top cover on its extremity side and having a plane on which various information is displayed.

13. A tire valve cap according to claim 12, wherein said disk member includes a groove for receiving one end of said return spring interposed between said disk member and said piston member, and a shoulder for positioning said cylinder member.

14. A tire valve cap according to claim 12, wherein said disk member carries a sheet member such as a photograph or a printed paper between front surface of said disk member and the inner surface of said cap end of said top cover.

15. A tire valve cap according to claim 12, wherein said disk member includes a notch or a through-hole in order to allow air to be discharged therethrough when it is placed on the inner surface of said cap end of said top cover.

16. A tire valve cap according to claim 12, wherein said cap end of said top cover on which inside said disk member is received is shaped into a magnifying lens.

* * * * *